United States Patent
Faruque et al.

(10) Patent No.: US 12,311,860 B2
(45) Date of Patent: May 27, 2025

(54) SLIDABLE POST ADJACENT ROTATABLE SEAT

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 316 days.

(21) Appl. No.: 17/936,536

(22) Filed: Sep. 29, 2022

(65) Prior Publication Data

US 2024/0109507 A1    Apr. 4, 2024

(51) Int. Cl.
 B60R 21/20 (2011.01)
 B60R 21/231 (2011.01)

(52) U.S. Cl.
 CPC ........ B60R 21/20 (2013.01); B60R 21/23138 (2013.01)

(58) Field of Classification Search
 CPC .............. B60R 21/20; B60R 2021/161; B60R 21/2171; B60R 21/013; B60R 21/0134; B60R 2021/01272; B60R 21/015; B60R 22/46; B60R 22/00; B60R 21/01552; B60R 2021/01088; B60N 2/14; B60N 2/002; B60N 2/0276; B60N 2/2863; B60N 2/01; B60N 2/143; B60N 2/0268; B60N 2/00; B60N 2/28; B60N 2230/30; B60N 2220/20; B60N 2230/20; B60N 2/773; B60N 2/3056; B60N 2/003; B60N 2/0735; B60N 2/0021; B60N 2/01516; B60N 2/0031
 See application file for complete search history.

(56) References Cited

U.S. PATENT DOCUMENTS

| | | | |
|---|---|---|---|
| 10,562,486 B2 * | 2/2020 | Jaradi | B60R 22/023 |
| 10,933,839 B2 * | 3/2021 | Jaradi | B60R 22/205 |
| 10,953,771 B2 * | 3/2021 | Faruque | B60N 2/14 |

(Continued)

FOREIGN PATENT DOCUMENTS

| | | | |
|---|---|---|---|
| JP | 2006347263 A | * | 12/2006 |
| JP | 2010202036 A | * | 9/2010 |
| JP | 2020157992 A | * | 10/2020 |

OTHER PUBLICATIONS

JP-2010202036-A English Translation (Year: 2010).*
JP-2006347263-A English Translation (Year: 2006).*
JP-2020157992-A English Translation (Year: 2020).*

*Primary Examiner* — James A Shriver, II
*Assistant Examiner* — Michael T. Walsh
(74) *Attorney, Agent, or Firm* — Frank A. MacKenzie; Brooks Kushman P.C.

(57) ABSTRACT

An assembly includes a vehicle roof and a vehicle floor spaced from the vehicle roof. The assembly includes a seat supported by the vehicle floor. The seat is rotatable about an axis of rotation from a forward-facing position to a rearward-facing position and the seat being movable along a vehicle-longitudinal axis. The assembly includes a post elongated from the vehicle floor to the vehicle roof. The post is slidable along the vehicle roof and the vehicle floor along the vehicle-longitudinal axis adjacent the seat. The assembly includes an airbag supported by the post.

20 Claims, 12 Drawing Sheets

(56) References Cited

U.S. PATENT DOCUMENTS

| | | | |
|---|---|---|---|
| 11,142,157 B2* | 10/2021 | Kim | B60N 2/14 |
| 11,364,872 B1* | 6/2022 | Jaradi | B60R 21/214 |
| 11,383,668 B1* | 7/2022 | Faruque | B60N 2/065 |
| 11,491,948 B2* | 11/2022 | Jaradi | B60R 21/2334 |
| 2021/0170980 A1* | 6/2021 | An | B60R 11/04 |
| 2022/0063546 A1 | 3/2022 | Jaradi et al. | |

* cited by examiner

SLIDABLE POST ADJACENT ROTATABLE SEAT

BACKGROUND

Vehicles are equipped with airbags. In the event of certain vehicle impact, an inflator activates and provides inflation medium to the airbags, and the airbags pressurize and act as supplemental restraints for occupants during the vehicle impact. The airbags are located at various fixed positions in passenger compartments of vehicles. Vehicles may include airbags supported on a dash, side air curtains mounted to the roof rails, side airbags mounted to seats, etc.

Vehicles may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

Figure 1:
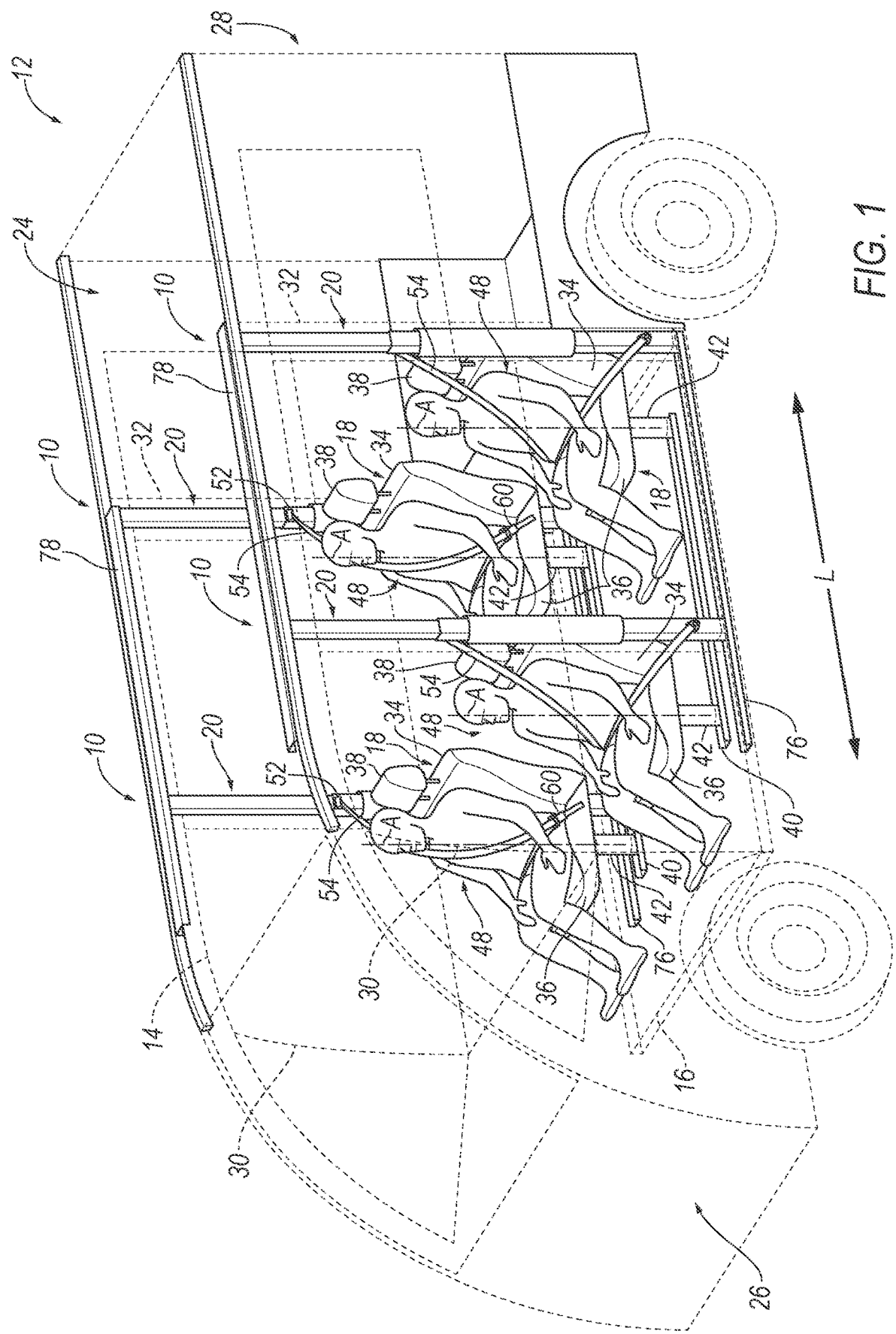
FIG. 1 is a perspective view of a vehicle having a plurality of seats adjacent a plurality of slidable posts.
Figure 2:
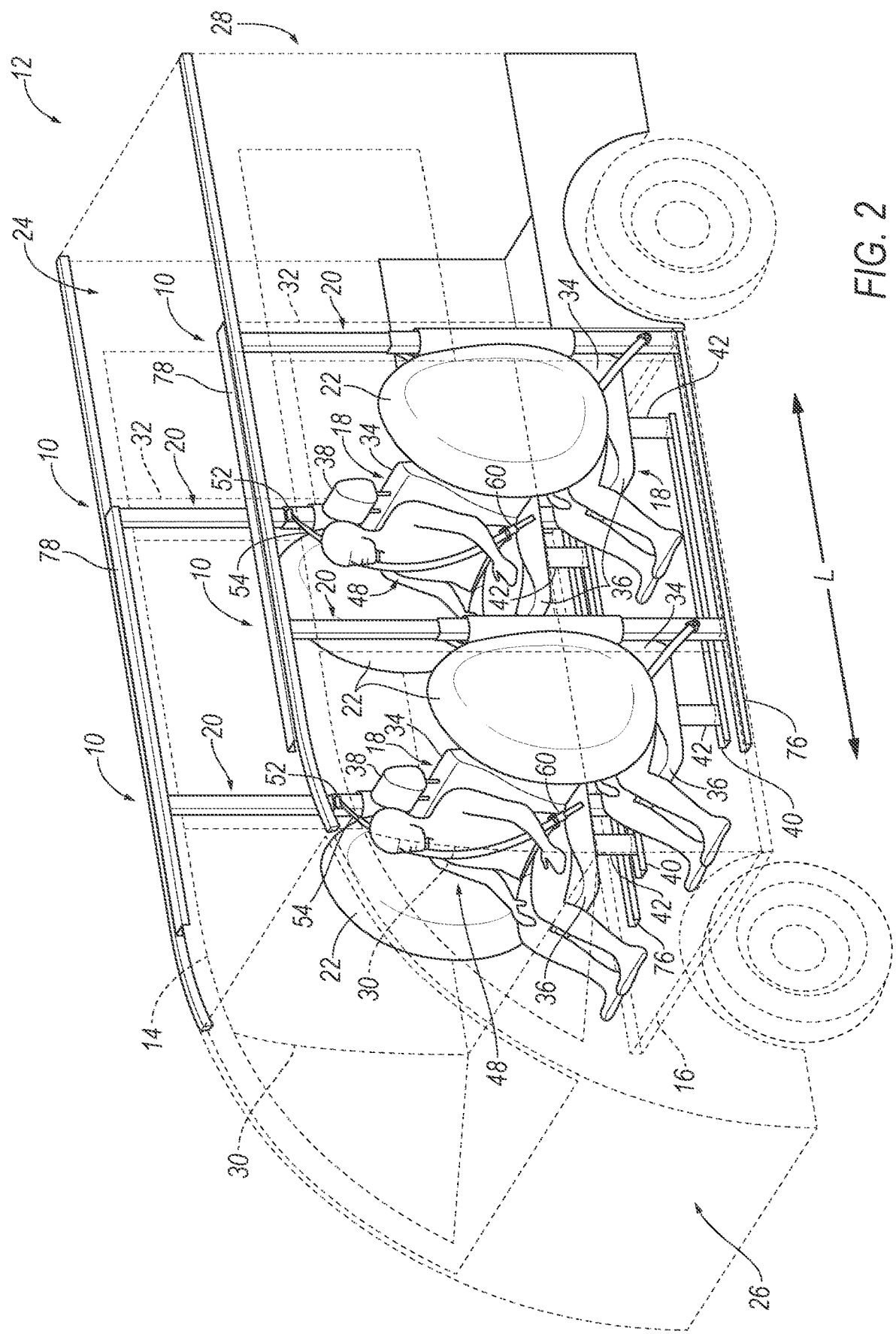
FIG. 2 is a perspective view of the vehicle having a plurality of seats adjacent a plurality of slidable posts and airbags in an inflated position.

An assembly includes a vehicle roof and a vehicle floor spaced from the vehicle roof. The assembly includes a seat supported by the vehicle floor. The seat is rotatable about an axis of rotation from a forward-facing position to a rearward-facing position and the seat being movable along a vehicle-longitudinal axis. The assembly includes a post elongated from the vehicle floor to the vehicle roof. The post is slidable along the vehicle roof and the vehicle floor along the vehicle-longitudinal axis adjacent the seat. The assembly includes an airbag supported by the post.

The airbag may be movable about the post.

The post may include a vehicle-forward side and a vehicle-rearward side. The airbag may be movable about the post from the vehicle-forward side to the vehicle rearward side.

The airbag may be on the vehicle-forward side of the post when the seat is in the forward-facing position and the airbag is on the vehicle-rearward side of the post when the seat is in the rearward-facing position.

The airbag may be inflatable in a vehicle-forward direction when the airbag is on the vehicle-forward side of the post and the airbag is inflatable in a vehicle-rearward direction when the airbag is on the vehicle-rearward side of the post.

The seat may be slidable along the vehicle-longitudinal axis. The post may be slidable to a position along the vehicle-longitudinal axis corresponding to a position of the seat along the vehicle-longitudinal axis.

The airbag may be inflatable between the seat and the post.

The seat may define an occupant seating area vehicle-inboard of the post, the airbag being inflatable between the post and the occupant seating area.

The assembly may include a seatbelt assembly supported by the post, the seatbelt assembly including a clip and a seatbelt webbing.

The assembly may include a pair of seatbelt buckles supported by the seat, the seatbelt buckles being spaced from each other in a cross-seat direction and the seatbelt buckles being engageable with the clip.

The clip may be engageable with one of the seatbelt buckles when the seat is in the forward-facing position and the clip is engageable with the other of the seatbelt buckles when the seat is in the rearward-facing position.

The airbag may be inflatable to an inflated position when the clip is engaged with one of the seatbelt buckles.

The vehicle roof may include a first track and the vehicle floor includes a second track, the post being slidable along the first track and the second track.

The assembly may include a motor operatively coupled to the airbag.

The assembly may include a second seat supported by the vehicle floor. The second seat may be rotatable about an axis of rotation from a forward-facing position to a rearward-facing position and the seat being movable along the vehicle-longitudinal axis. The assembly may include a second post elongated from the vehicle floor to the vehicle roof, the second post being slidable along the vehicle roof and the vehicle floor along the vehicle-longitudinal axis adjacent the second seat. The assembly may include a second airbag supported by the second post.

The assembly may include a computer including a processor and a memory storing instructions executable by the processor to identify a position of the seat along the vehicle-longitudinal axis and slide the post to a position along the vehicle-longitudinal axis corresponding to the position of the seat.

The instructions may further include instructions to identify the seat is in the forward-facing position and move the airbag to a vehicle-forward side of the post based on identification that the seat is in the forward-facing position.

The instructions may further include instructions to identify the seat is in the rearward-facing position and move the airbag to a vehicle-rearward side of the post based on identification that the seat is in the rearward-facing position.

With reference to the Figures, wherein like numerals indicate like parts throughout the several views, an assembly 10 for a vehicle 12 includes a vehicle roof 14 and a vehicle floor 16 spaced from the vehicle roof 14. The assembly 10 includes a seat 18 supported by the vehicle floor 16. The seat 18 is rotatable about an axis A of rotation from a forward-facing position to a rearward-facing position and the seat 18 being movable along a vehicle-longitudinal axis L. The assembly 10 includes a post 20 elongated from the vehicle floor 16 to the vehicle roof 14. The post 20 is slidable along the vehicle roof 14 and the vehicle floor 16 along the vehicle-longitudinal axis L adjacent the seat 18. The assembly 10 includes an airbag 22 supported by the post 20.

The post 20 slides along the vehicle-longitudinal axis L to be adjacent the seat 18. The movement of the post 20 allows the seat 18 to move within the vehicle 12 and the post 20 to slide to a position adjacent the seat 18. The position of the post 20 may be adjusted based on the seat 18 being rotatable. The post 20 slides adjacent the seat 18 to position the airbag 22 adjacent the seat 18 to control the kinematics of an occupant of the seat 18 in the event of certain vehicle impact.

With reference to FIGS. 1-4, the vehicle 12 may be any suitable type of ground vehicle, e.g., a passenger or commercial automobile such as a sedan, a coupe, a truck, a sport utility, a crossover, a van, a minivan, a taxi, a bus, etc.

The vehicle 12 defines a passenger compartment 24 to house occupants, if any, of the vehicle 12. The passenger compartment 24 may extend across the vehicle 12, i.e., from one side to the other side of the vehicle 12. The passenger compartment 24 includes a front end 26 and a rear end 28 with the front end 26 being in front of the rear end 28 during forward movement of the vehicle 12.

The vehicle 12 includes a vehicle body (not numbered). The vehicle body includes body panels partially defining an exterior of the vehicle 12. The body panels may present a class-A surface, e.g., a finished surface exposed to view by a customer and free of unaesthetic blemishes and defects. The body panels include, e.g., a roof 14, etc.

The vehicle body includes the vehicle roof 14 and the vehicle floor 16. The vehicle body, specifically the vehicle roof 14, includes two roof rails. The roof rails are spaced from one another in a cross-vehicle direction. The roof rails each extend longitudinally along the vehicle body, i.e., along the vehicle-longitudinal axis L.

The vehicle body may include pillars 30, 32 spaced from each along the vehicle-longitudinal axis L on both sides of the vehicle body. Specifically, the vehicle body includes a front pillar 30, and a rear pillar 32 spaced vehicle-rearward from the front pillar 30 on each side of the vehicle body. For example, the vehicle body includes a front pillar 30 and a rear pillar 32 on each side of the vehicle 12 with the front pillar 30 being spaced from the rear pillar 32. In other words, the front pillar 30 may be disposed at the front end 26 of the passenger compartment 24. The pillars 30, 32 may extend from the vehicle roof 14 to the vehicle floor 16. The vehicle 12 may include other pillars in addition to the front pillar 30 and the rear pillar 32.

With continued reference to FIGS. 1-4, the vehicle body includes rockers (not numbered) extending from the front pillar 30 to the rear pillar 32. Specifically, the vehicle body may include two rockers, one on each side of the vehicle body. The rockers are elongated along the vehicle-longitudinal axis L. The vehicle 12 may include two rockers, i.e., one rocker on either side of the passenger compartment 24. The rockers are spaced from the roof rails below the roof rails. The rockers are below the passenger compartment 24. In some examples, the rockers may be connected to the pillars 30, 32 in any suitable way, e.g., welding, adhesive, fasteners, etc. In other words, in such examples, the rockers and the pillars 30, 32 are separate from each other and connected to each other. In other examples, the rockers may be unitary with the pillars 30, 32, i.e., a single, uniform piece of material with no seams, joints, fasteners, or adhesives holding it together. In such an example, the pillars 30, 32 and the rocker may be formed together simultaneously as a single continuous unit, e.g., by molding, forging, casting, stamping, etc. The vehicle floor 16 may be supported by the rockers.

The vehicle roof 14 and the vehicle floor 16 are spaced from each other. Specifically, the vehicle floor 16 is spaced downwardly from the vehicle roof 14. The vehicle roof 14 defines the upper boundary of the passenger compartment 24 and may extend from the front end 26 of the passenger compartment 24 to the rear end 28 of the passenger compartment 24. The vehicle roof 14 may include a roof panel (not shown) extending from one roof rail to the other roof rail. The roof panel may be irremovably fixed to the roof rails. In other words, the roof panel is secured to the roof rails in such a way that removal requires destruction such as cutting, e.g., cutting material and/or welded joints, etc. As an example, the roof panel may be attached to both roof rails, e.g., by welding, fasteners, etc.

The vehicle floor 16 defines the lower boundary of the passenger compartment 24 and may extend from the front end 26 of the passenger compartment 24 to the rear end 28 of the passenger compartment 24. The vehicle floor 16 may include a floor panel (not numbered) and upholstery on the floor panel, for example, carpet, and may have a class-A surface facing the passenger compartment 24, i.e., a surface specifically manufactured to have a high quality, finished, aesthetic appearance free of blemishes. The roof panel and the floor panel may be, for example, a suitable metal such as steel or aluminum or a suitable polymer such as fiber-reinforced plastic.

The vehicle body may define a door opening (not numbered). Specifically, the vehicle body may include one or more door opening between pillars 30, 32 of the vehicle body. The door opening may be between the front pillar 30 and the rear pillar 32 and between the rocker and the roof rail. In other words, the pillars 30, 32 are spaced from each other by the door opening and the roof rail and rocker are spaced from each other by the door opening. The door opening extends uninterrupted from the front pillar 30 to the rear pillar 32. The door opening extends uninterrupted from the rocker to the roof rails. The door opening allows for ingress and egress into the passenger compartment 24. The vehicle 12 may include any suitable number of door openings to allow for ingress and egress into the passenger compartment 24. For example, as shown in the Figures, the vehicle 12 may include a door opening on each side of the vehicle 12. In other examples, the vehicle 12 may include multiple door openings on each side of the vehicle 12.

The vehicle 12 includes a plurality of doors (not numbered), e.g., a front door and a rear door on each side of the vehicle body, movable from a closed position to an open position for vehicle 12 occupants to enter and exit a passenger compartment 24. The front door may be supported by the front pillar 30 and the rear door may be supported by the rear pillar 32 in the door opening. In the closed position, the doors are in at least one of the door openings in the vehicle body. The first door and the second door are both in the single door opening in the vehicle body. In the open position, at least one of the door openings in the vehicle body may be exposed.

With continued reference to FIGS. 1-4, the vehicle body may not include a middle pillar between the front pillar 30 and the rear pillar 32, i.e., the vehicle body may not include a middle pillar between the front pillar 30 and the rear pillar 32 from the vehicle floor 16 to the vehicle roof 14. In other words, the vehicle body is B-pillarless. The vehicle body lacking a middle pillar allows for the door opening to extend from the front pillar 30 to the rear pillar 32. The door opening extending from the front pillar 30 to the rear pillar 32 allows occupants easier access to the passenger compartment 24 for ingress and egress.

The vehicle 12 may include one or more seats 18. Specifically, the vehicle 12 may include any suitable number of seats 18. The seats 18 are supported by the vehicle floor 16. The seats 18 may be arranged in any suitable arrangement in the passenger compartment 24. As in the example shown in the Figures, one or more of the seats 18 may be at the front end 26 of the passenger compartment 24. In other examples, one or more of the seats 18 may be behind the front end 26 of the passenger compartment 24, e.g., at the rear end 28 of the passenger compartment 24. The seat 18 may be of any suitable type, e.g., a bucket seat.

The seats 18 include a seatback 34, a seat bottom 36, and a head restraint 38. The head restraint 38 may be supported by and extending upwardly from the seatback 34. The head restraint 38 may be stationary or movable relative to the seatback 34. The seatback 34 may be supported by the seat bottom 36 and may be stationary or movable relative to the seat bottom 36. The seatback 34, the seat bottom 36, and the head restraint 38 may be adjustable in multiple degrees of freedom. Specifically, the seatback 34, the seat bottom 36, and the head restraint 38 may themselves be adjustable. In other words, adjustable components within the seatback 34, the seat bottom 36, and the head restraint 38 may be adjustable relative to each other.

The seatback 34 includes a seat frame (not shown) and a covering (not numbered) supported on the seat frame. The seat frame may include tubes, beams, etc. Specifically, the seat frame includes a pair of upright frame members. The upright frame members are elongated, and specifically, are elongated in a generally upright direction when the seatback 34 is in a generally upright position. The upright frame members are spaced from each other and the seat frame includes one or move cross-members extending between the upright frame members. The seat frame, including the upright frame members, may be of any suitable plastic material, e.g., carbon fiber reinforced plastic (CFRP), glass fiber-reinforced semi-finished thermoplastic composite (organosheet), etc. As another example, some or all components of the seat frame may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame. The padding may be between the covering and the seat frame and may be foam or any other suitable material.

Each seat 18 may rotate about an axis A of rotation that extends through the vehicle roof 14 and the vehicle floor 16. The seats 18 are rotatable between a forward-facing position and a rearward-facing position. In the forward-facing position, an occupant of the seat 18 faces the front end 26 of the passenger compartment 24. In the rearward-facing position, an occupant of the seat 18 faces the rear end 28 of the passenger compartment 24. The seats 18 may rotate completely, i.e., 360°, about the axis. The seats 18 may rotate between fixed positions, e.g., the forward-facing position and the rearward-facing position.

The seats 18 may be movable relative to the vehicle floor 16 to various positions, e.g., movable fore-and-aft and/or cross-vehicle. In the example shown in the Figures, the seats 18 are movable along the vehicle-longitudinal axis L. Specifically, the seats 18 are slidable along the vehicle-longitudinal axis L. The seats 18 are slidable relative to the vehicle floor 16 along the vehicle-longitudinal axis L. The vehicle floor 16 may include a seat track 40 engaged with one or more of the seats 18. For example, as shown in the Figures, the seats 18 may include a pedestal 42 elongated from the seat bottom 36 to the seat track 40. The pedestal 42 may move along the seat track 40 to move the seats 18 along the vehicle-longitudinal axis L.

The assembly 10 includes the post 20. The post 20 is operable to be positioned adjacent one or more seats 18 in the passenger compartment 24. Specifically, the post 20 is between the front pillar 30 and the rear pillar 32. The post 20 is elongated from the vehicle floor 16 to the vehicle roof 14 between the front pillar 30 and the rear pillar 32. The post 20 is movable between the front pillar 30 and the rear pillar 32. Specifically, the post 20 is slidable along the vehicle floor 16 and the vehicle roof 14 along the vehicle-longitudinal axis L. Specifically, the post 20 may be slidable along the vehicle-longitudinal axis L relative to the vehicle floor 16 and the vehicle roof 14 and adjacent the seat 18. In other words, the post 20 may move in a vehicle-forward direction and in a vehicle-rearward direction. The post 20 is slidable along one or more door openings of the vehicle 12, e.g., adjacent the door openings. When the doors are in the closed position, the post 20 is slidable along the doors adjacent the post 20. The post 20 is slidable from a stowed position to a deployed position, i.e., a position corresponding to a position of one of the seats 18 in the vehicle 12. The position corresponding to the seat 18 may vary depending on the position of the seat 18 in the vehicle 12 along the vehicle-longitudinal axis L. The post 20 may be in the stowed position when the vehicle 12 is parked or not in use and the post 20 may be in the deployed position when the vehicle 12 is going to be moving along a roadway. The stowed position may allow the occupant to enter and exit the vehicle 12.

Figure 5:
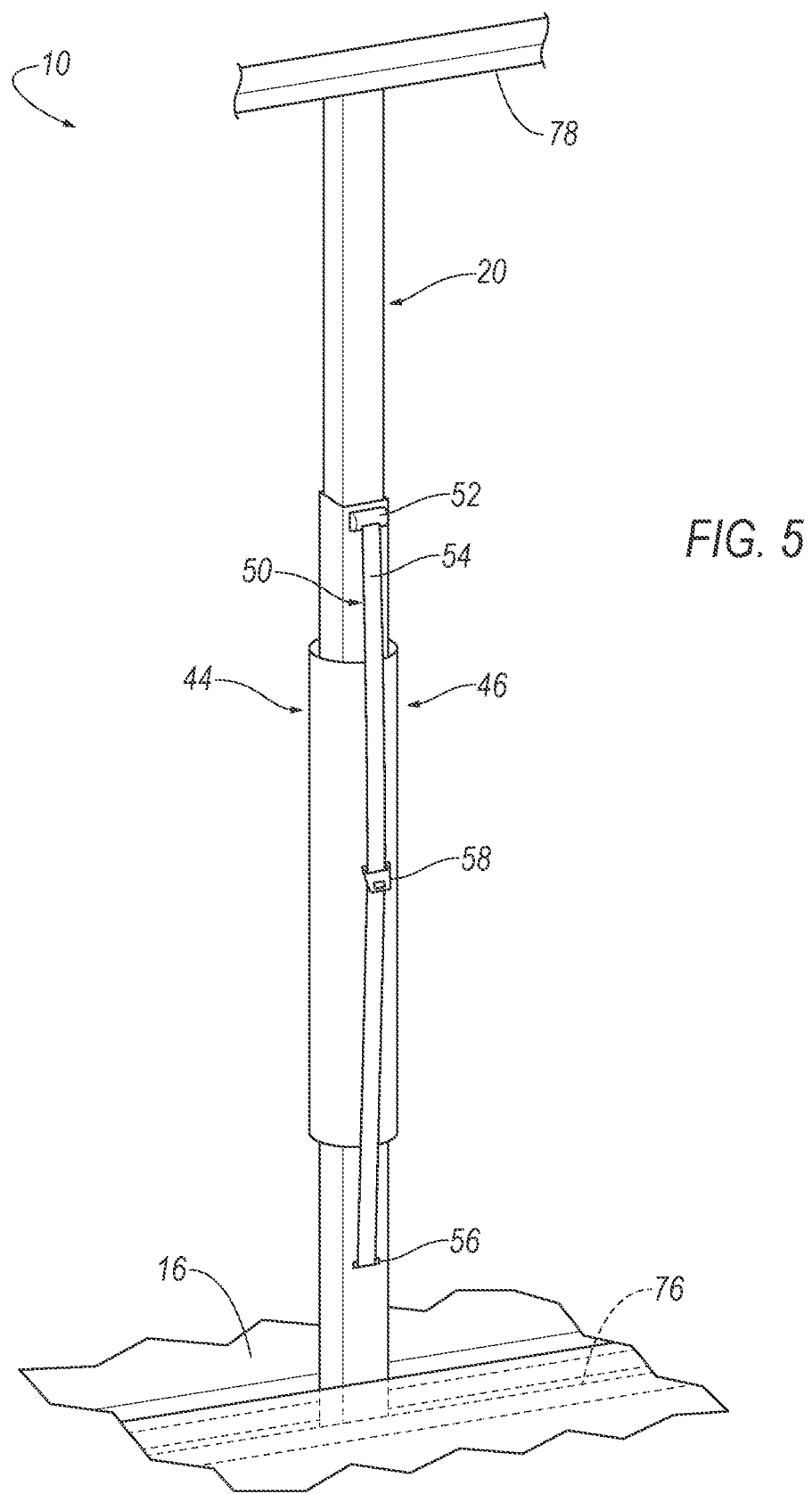
FIG. 5 is a perspective view of a post.
Figure 6A:
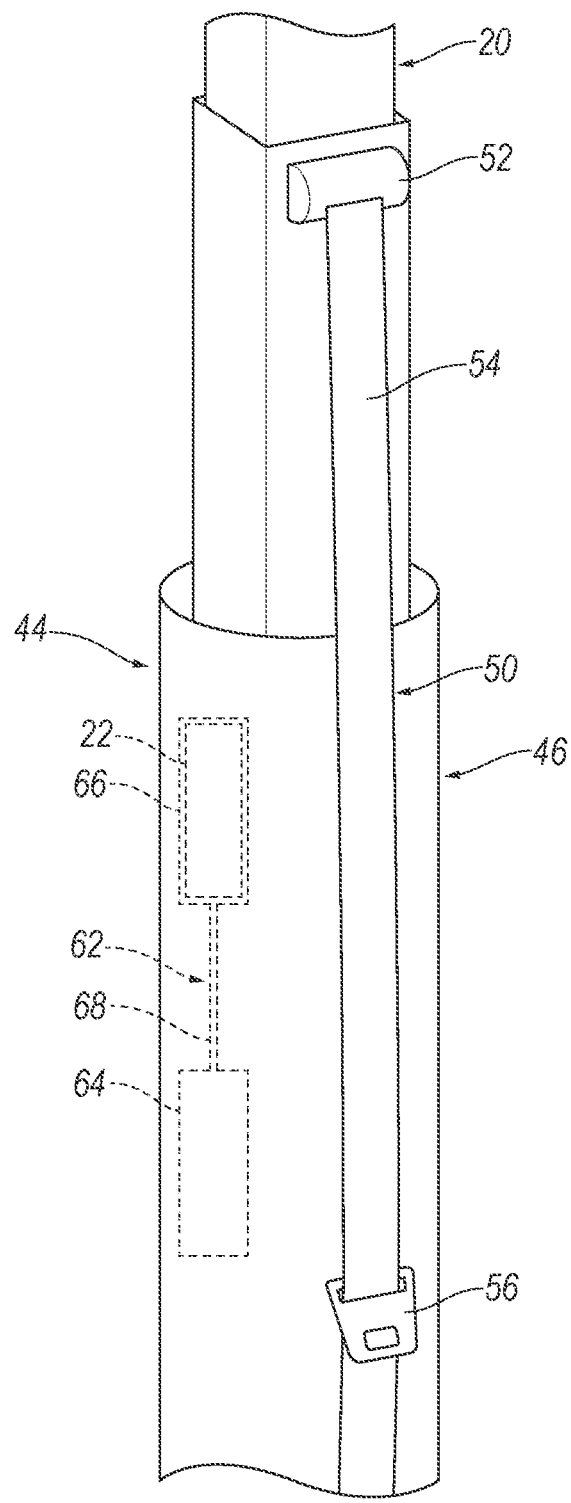
FIG. 6A is a perspective view of the post with an airbag on a vehicle-forward side of the post.
Figure 6B:
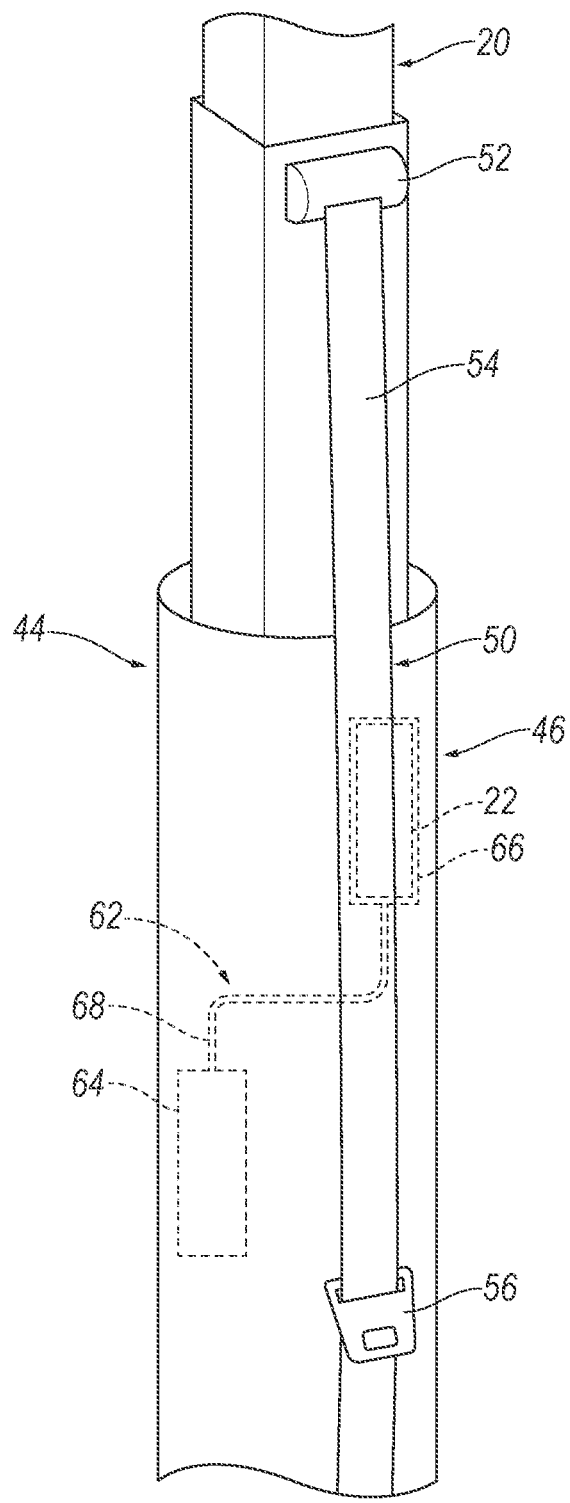
FIG. 6B is a perspective view of the post with an airbag on a vehicle-rearward side of the post.
Figure 7:
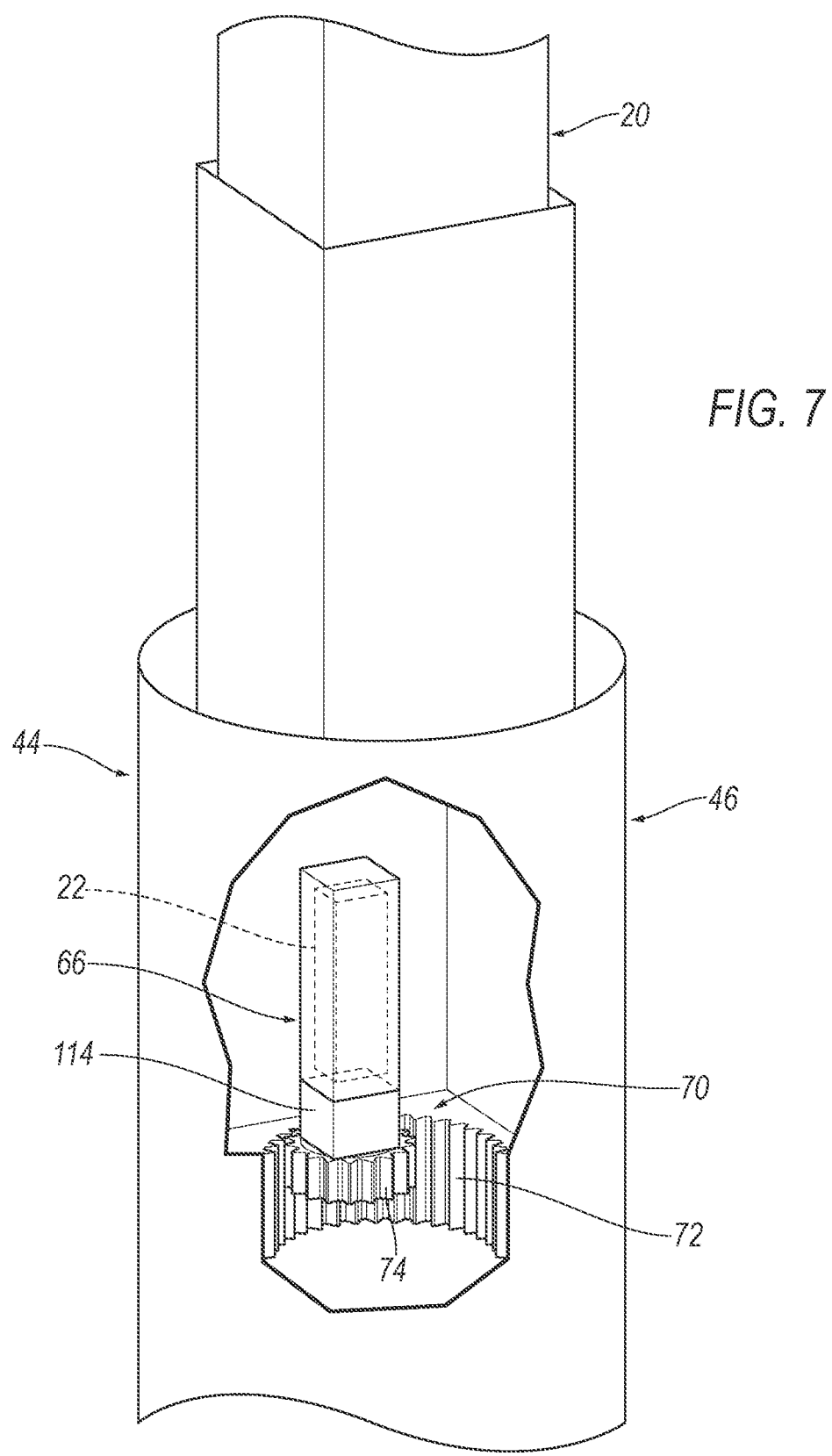
FIG. 7 is a partial cut away view of the post showing an actuator to move the airbag from the vehicle-forward side of the post to the vehicle-rearward side of the post.

With reference to FIGS. 5-7, the post 20 may include a vehicle-forward side 44 and a vehicle-rearward side 46. The vehicle-forward side 44 may be located on a side of the post 20 that faces forward in the vehicle 12. For example, the vehicle-forward side 44 may be on a side of the post 20 that faces a direction of the vehicle 12 moving forward. The vehicle-rearward side 46 may be located on a side of the post 20 that faces rearward in the vehicle 12. For example, the vehicle-rearward side 46 may be on a side of the post 20 that faces a direction of the vehicle 12 moving rearward.

The seats 18 each define an occupant seating area 48 vehicle-inboard of the post 20. The occupant seating area 48 is the area occupied by an occupant when properly seated in a seat 18 of the vehicle 12. The occupant seating area 48 is adjacent the post 20. Specifically, the occupant seating area 48 is vehicle-inboard of the post 20. The occupant seating area 48 position may be adjusted depending on the position of the seat 18 in the passenger compartment 24.

With continued reference to FIGS. 5-7, the assembly 10 may include a seatbelt assembly 50 supported by the post 20. The seatbelt assembly 50 may include a seatbelt retractor 52 and a seatbelt webbing 54 retractably extendable from the seatbelt retractor 52. The seatbelt retractor 52 is supported by the post 20. The seatbelt assembly 50 may include an anchor 56 mounted to the post 20 and coupled to the seatbelt webbing 54. The seatbelt retractor 52 includes a housing and a spool rotatably supported by the housing. The seatbelt webbing 54 may be fabric, e.g., woven polyester.

The spool is selectively rotatable relative to the housing to pay out and retract the seatbelt webbing 54 relative to the spool. The spool may be spring-loaded relative to the housing, e.g., with a spring 90 between the spool and the housing, to automatically retract slack from the seatbelt webbing 54.

The spool may be lockable from an unlocked position to a locked position, e.g., with a locking device (not shown) moveable relative to the housing and the spool between the unlocked position and the locked position. With the spool in the unlocked position, the seatbelt webbing 54 may be extended from and retracted into the seatbelt retractor 52. In other words, the seatbelt webbing 54 may be coiled and uncoiled freely about the spool. With the spool in the locked position, the seatbelt retractor 52 controls extension of the seatbelt webbing 54 to control the kinematics of the occupant. Specifically, the spool is locked relative to the housing. In some examples, the seatbelt retractor 52 may include a torsion bar, load limiter, etc., including known structures, which allows for a controlled amount of payout of the seatbelt webbing 54. The spool may be in the unlocked position by default, i.e., in the absence of a sudden deceleration. The spool may change from the unlocked position to the locked position during a sudden deceleration of the vehicle 12, i.e., the deceleration may trigger components of the seatbelt retractor 52, e.g., the locking device, to change from the unlocked position to the locked position, e.g., the spool.

As one example, the locking device may engage the spool in response to deceleration of the vehicle 12, e.g., a sudden slowing of the vehicle 12, sudden stop, certain vehicle impacts, etc. In other words, the locking device may be moved from the unlocked position to the locked position by sudden vehicle deceleration. The locking device may engage the spool in response to an activation sensor (not shown). The activation sensor senses sudden deceleration of the vehicle 12 and triggers activation of the locking device, i.e., moves the locking device to the locked position. As one example, the activation sensor may be in the seatbelt retractor 52 and may be, for example, a weighted pendulum, a centrifugal clutch, or any other suitable type. As an example shown in the Figures, the second end of the spool may include teeth and the locking device may include a pawl that releasably engages the teeth. Specifically, the activation sensor, when triggered, moves the pawl into engagement with the teeth. The activation sensor triggers the pawl to disengage the teeth to selectively release the spool from the locked position to the unlocked position in response to predetermined activity, e.g., by a change in inertia.

The seatbelt assembly 50 may include a clip 58 that is engageable with a seatbelt buckle 60. The clip 58 slides freely along the seatbelt webbing 54 and, when engaged with the seatbelt buckle 60, divides the seatbelt webbing 54 into a lap band and a shoulder band. The seatbelt buckle 60 may be supported by the seat bottom 36. Specifically, a pair of seatbelt buckles 60 may be supported by the seat bottom 36. The seatbelt buckles 60 may be spaced from each other in a cross-seat direction. In other words, a seatbelt buckle 60 may be supported on either side of the seat bottom 36 and be spaced from each other across the seat bottom 36. The seat bottom 36 is between the seatbelt buckles 60. The occupant seating area 48 is between the seatbelt buckles 60.

Depending on the position of the seat 18, the clip 58 may be engageable with a different seatbelt buckle 60. In other words, the clip 58 is engageable with one of the seatbelt buckles 60 when the seat 18 is in the forward-facing position and the clip 58 is engageable with the other of the seatbelt buckles 60 when the seat 18 is in the rearward-facing position. The clip 58 is engageable with the seatbelt buckle 60 on the seat bottom 36 that is furthest from the post 20. In other words, one of the seatbelt buckles 60 is between the other of the seatbelt buckles 60 and the post 20.

The occupant seating area 48 is between the post 20 and one of the seatbelt buckles 60. The other of the seatbelt buckles 60 is between the occupant seating area 48 and the post 20. The seatbelt webbing 54 extends from the post 20 to the farthest seatbelt buckle 60 supported by the seat bottom 36 when the clip 58 is engaged with the farthest seatbelt buckle 60. Specifically, the seatbelt webbing 54 extends across the occupant seating area 48 when the clip 58 is engaged with the farthest seatbelt buckle 60.

The seatbelt assembly 50 may be a three-point harness, meaning that the seatbelt webbing 54 is attached at three points around the occupant when fastened. The seatbelt assembly 50 may, alternatively, include another arrangement of attachment points.

With continued reference to FIGS. 5-7, the assembly 10 includes an airbag assembly 62 supported by the post 20. The airbag assembly 62 includes the airbag 22, an inflator 64, and may include a housing. Specifically, the airbag 22 is supported by the post 20. The vehicle 12 may include any suitable number of airbag assemblies 62. As one example, such as shown in the Figures, each of the posts 20 of the vehicle 12 may include one airbag assembly 62. In examples including more than one airbag assembly 62, the airbag assemblies 62 may be identical or substantially identical to each other.

The airbag 22 is inflatable from an uninflated position to an inflated position when the clip 58 is engaged with one of the seatbelt buckles 60 and in response to certain vehicle impact. In other words, the airbag 22 inflates to the inflated position when an occupant is seated in a seat 18 in the vehicle 12 in response to certain vehicle impact. The airbag 22 inflates between the post 20 and the seat 18. Specifically, the airbag 22 inflates between the post 20 and the occupant seating area 48. The airbag 22 may control the kinematics of the occupant in the seat 18 adjacent the post 20. The airbag 22 may use the post 20 as a reaction surface when the airbag 22 is in the inflated position and the airbag 22 is controlling the kinematics of the occupant.

The inflator 64 is fluidly connected to the airbag 22. The inflator 64 expands the airbag 22 with inflation medium, such as a gas, to move the airbag 22 from the uninflated position to the inflated position. The inflator 64 may be, for example, a pyrotechnic inflator that ignites a chemical reaction to generate the inflation medium, a stored gas inflator that releases (e.g., by a pyrotechnic valve) stored gas as the inflation medium, or a hybrid. A fill tube 68 may extend from the inflator 64 to the airbag 22 to expand the airbag 22.

With reference to FIGS. 6A and 6B, as discussed above, the airbag 22 is supported by the post 20. The airbag 22 is movable about the post 20. Specifically, the airbag 22 is movable about the post 20 from the vehicle-forward side 44 to the vehicle-rearward side 46. The airbag 22 moves relative to the post 20 depending on the position of the seat 18 adjacent the post 20. In other words, the airbag 22 moves relative to the post 20 to control the kinematics of the occupant depending on the position of the seat 18. For example, when the seat 18 is in the forward-facing position, the airbag 22 is on the vehicle-forward side 44 of the post 20.

When the seat 18 is in the rearward-facing position, the airbag 22 is on the vehicle-rearward side 46 of the post 20.

With reference to FIG. 7, when the airbag 22 is on the vehicle-forward side 44 of the post 20, the airbag 22 inflates in the vehicle-forward direction. In other words, the airbag 22 may inflate toward the front end 26 of the passenger compartment 24 when the airbag 22 is on the vehicle-forward side 44 of the post 20. When the airbag 22 is on the vehicle-rearward side 46 of the post 20, the airbag 22 inflates in the vehicle-rearward direction. In other words, the airbag 22 may inflate toward the rear end 28 of the passenger compartment 24 when the airbag 22 is on the vehicle-rearward side 46 of the post 20.

To rotate the airbag 22, the assembly 10 includes an actuator 70 to move the airbag 22 about the post 20. In the example shown in the Figures, the actuator 70 includes an airbag rack 72 and an airbag pinion 74 to move the airbag 22 from the vehicle-forward side 44 to the vehicle-rearward side 46 of the post 20. The actuator 70 may include an airbag motor 114 operatively coupled to the airbag 22 to move the airbag 22 between the vehicle-forward side 44 and the vehicle-rearward side 46 of the post 20. The airbag motor 114 rotates the airbag pinion 74 to move along the airbag rack 72, and in turn, move the airbag 22 about the post 20. In other examples, the actuator 70 may be any suitable type of actuator 70 to move the airbag 22 about the post 20, e.g., gears, etc.

The airbag 22 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

With reference to FIGS. 1-5 and 8-10, as discussed above, the post 20 is slidable along the vehicle floor 16 and the vehicle roof 14. The vehicle 12 may include tracks 76, 78 that the post 20 is slidable along. Specifically, the vehicle roof 14 includes a first track 76 and the vehicle floor 16 includes a second track 78. The post 20 is slidable to a position along the vehicle-longitudinal axis L corresponding to a position of the seat 18 along the vehicle-longitudinal axis L. Specifically, the post 20 is slidable along the first track 76 and the second track 78 to the deployed position, i.e., a position corresponding to the position of the seat 18 so that the airbag 22 and the seatbelt assembly 50 (in examples including the seatbelt assembly 50 on the post 20) are positioned to control the kinematics of the occupant of the seat 18. The adjectives first and second relating to the tracks 76, 78 are used throughout this document as identifiers and, unless explicitly stated otherwise, are not intended to signify importance, order, or quantity. The first track 76 and the second track 78 are both elongated along the vehicle-longitudinal axis L.

Figure 8:
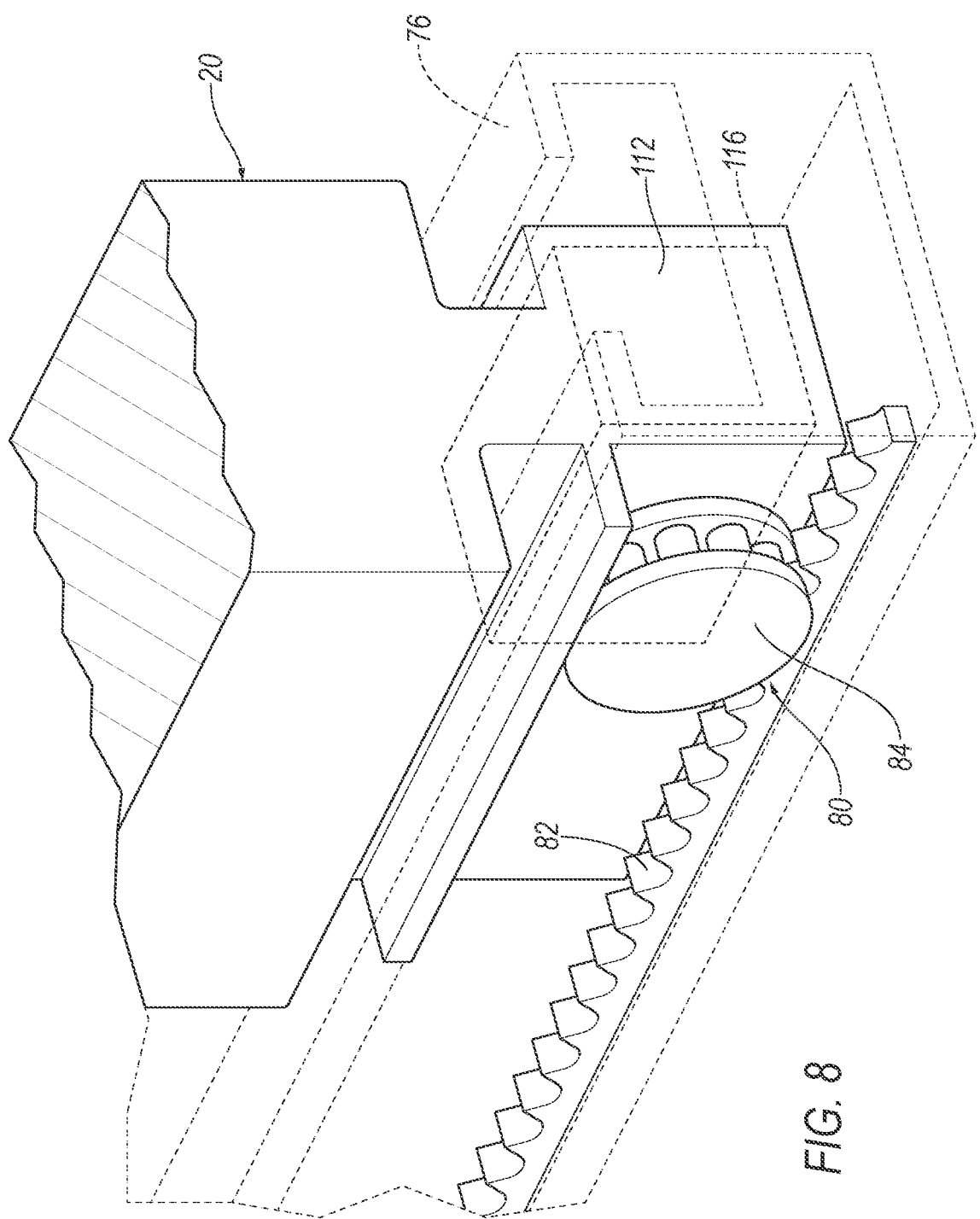
FIG. 8 is a perspective view of a linear actuator to move the post along a track.
Figure 9A:
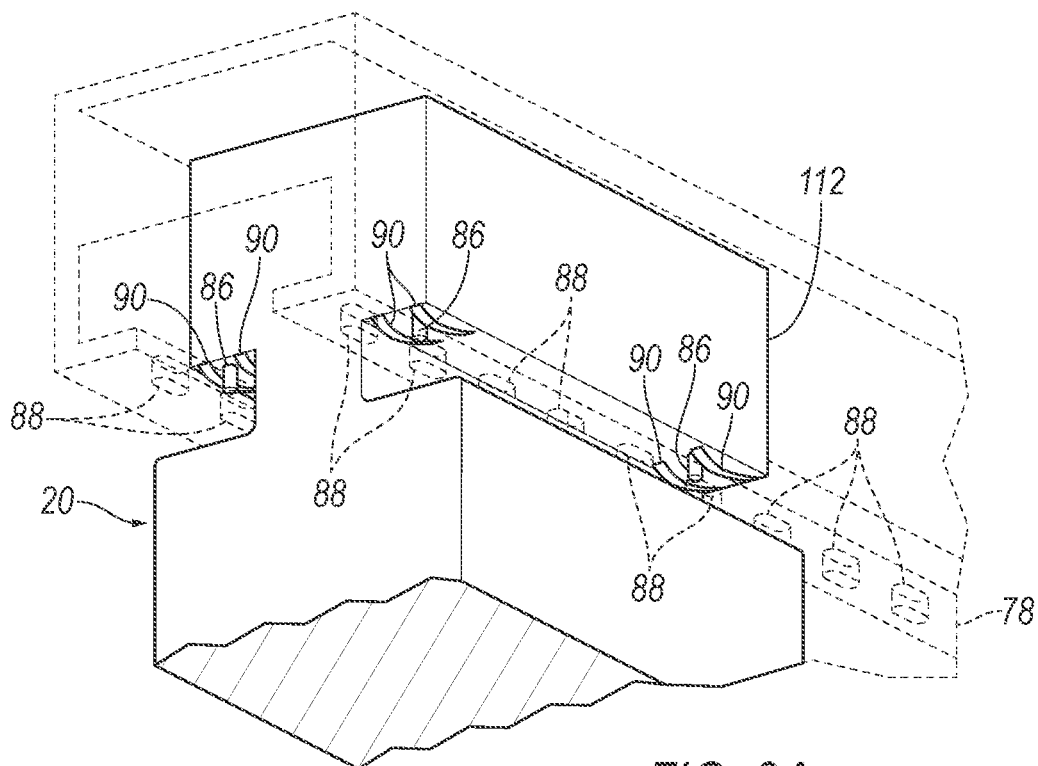
FIG. 9A is a perspective view of a lock between the post and a track when the post is not tilted.
Figure 9B:
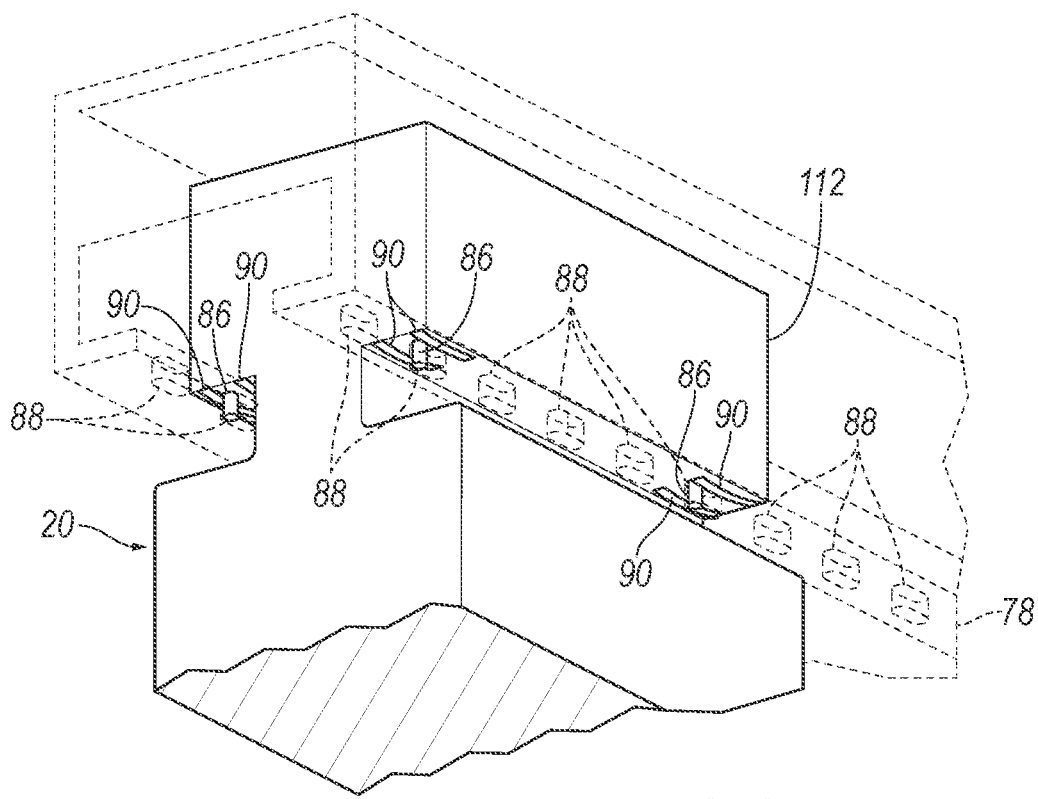
FIG. 9B is a perspective view of a lock between the post and a track when the post is tilted.
Figure 10A:
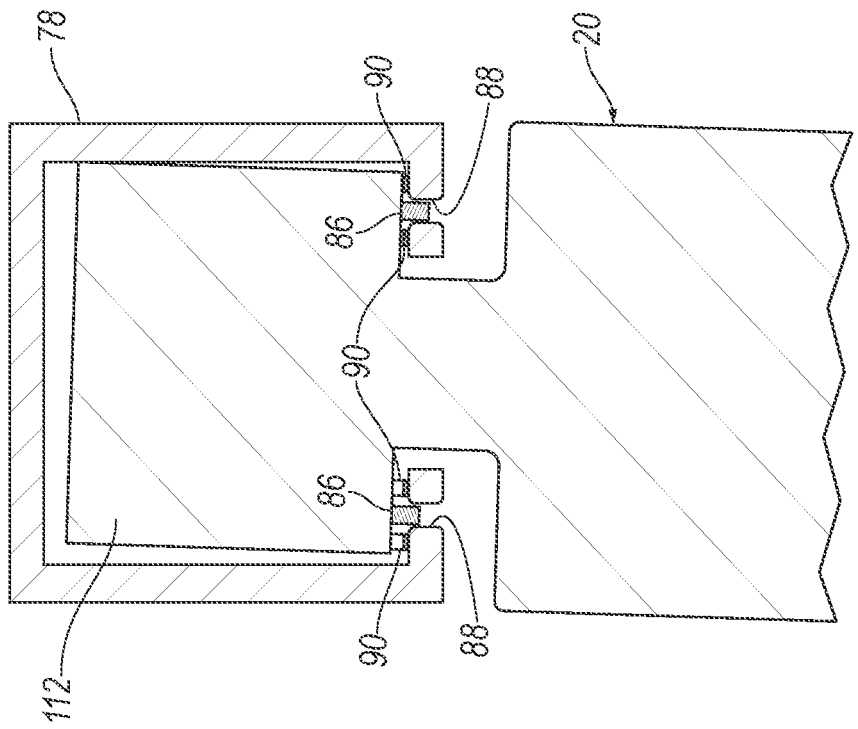
FIG. 10A is a cross-sectional view through line A of FIG. 9A.
Figure 10B:
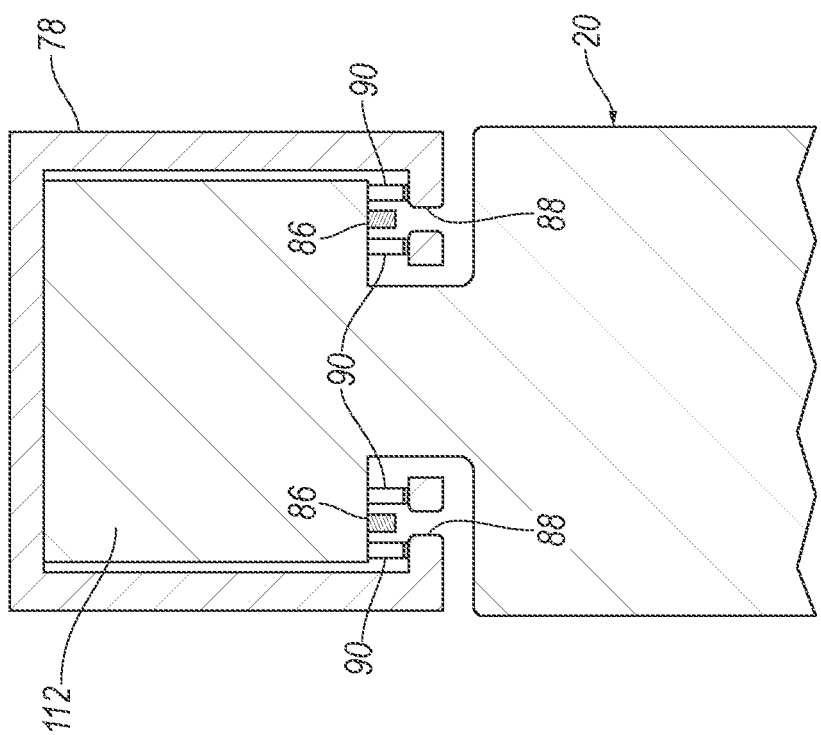
FIG. 10B is a cross-sectional view through line B of FIG. 9B.

With reference to FIG. 8, the assembly 10 may include one or more linear actuators 80 fixed to one or more of the tracks 76, 78 and drivably coupled to the post 20 to slide the post 20 along the tracks 76, 78. The assembly 10 may include a linear actuator 80 couples to a bottom of the post 20 in the second track 78 to slide the post 20 along the vehicle-longitudinal axis L. The linear actuator 80 may include a track rack 82 and a track pinion 84 to move the post 20 along the first track 76 and the second track 78. The linear actuator 80 may include a post motor 116 that rotates the track pinion 84 to move along the track rack 82, and in turn, moving the post 20 along the second track 78.

With reference to FIGS. 9A-10B, the post 20 may be lockable relative to the vehicle floor 16 and the vehicle roof 14. Specifically, the post 20 may be relative to the tracks 76, 78. In other words, when locked, the post 20 remains stationary relative to the vehicle floor 16, the vehicle roof 14, and the tracks 76, 78. For example, the first track 76, i.e., the first track 76 of the vehicle roof 14, may include a plurality of slots 88 and the post 20 may include a peg 86 to lock the post 20 in position in the event of certain vehicle impacts. The post 20 may include a carriage 112 movable along the first track 76. As discussed above, the airbag 22 may use the post 20 as a reaction surface when the airbag 22 is in the inflated position. In such an event, the post 20 may tilt, i.e., be at an angle greater than 90 degrees relative to the first track 76 and vehicle roof 14 cross-vehicle of the post 20 to forces on the post 20 during the vehicle impact. When the post 20 tilts cross-vehicle the lock limits movement of the post 20 along the tracks 76, 78. The first track 76 may define the plurality of slots 88 along a bottom surface of the first track 76 and the carriage 112 may include the pegs 86 extending upwardly toward the slots 88 of the first track 76. The pegs 86 are receivable by the slots 88 to lock the post 20 relative to the tracks 76, 78. When the post 20 tilts in the event of certain vehicle impact, the pegs 86 are received by the slots 88 to limit movement of the carriage 112 and post 20 along the tracks 76, 78. During normal operation of the vehicle 12, i.e., when there is not a vehicle impact, the pegs 86 are not received by a slot 88 in the track and the carriage 112 is able to move freely within the tracks 76, 78.

A plurality of springs 90 may be supported by the carriage 112 of the post 20. The springs 90 may be supported at corners of the carriage 112. Specifically, the pegs 86 may each be between two springs 90. The springs 90 may provide a force normal to the first track 76. The springs 90 may slide along the first track 76 during regular operation of the post 20, e.g., when the post 20 is moving to a position corresponding the seat 18 in the vehicle 12, to allow the pegs 86 to maintain clearance with the slots 88 as the carriage 112 slides along the first track 76. In the event of certain vehicle impact to the vehicle 12, the springs 90 compress from the post 20 being used as a reaction surface for the airbag 22 to allow the pegs 86 to engage the slots 88 along the first track 76.

Figure 3:
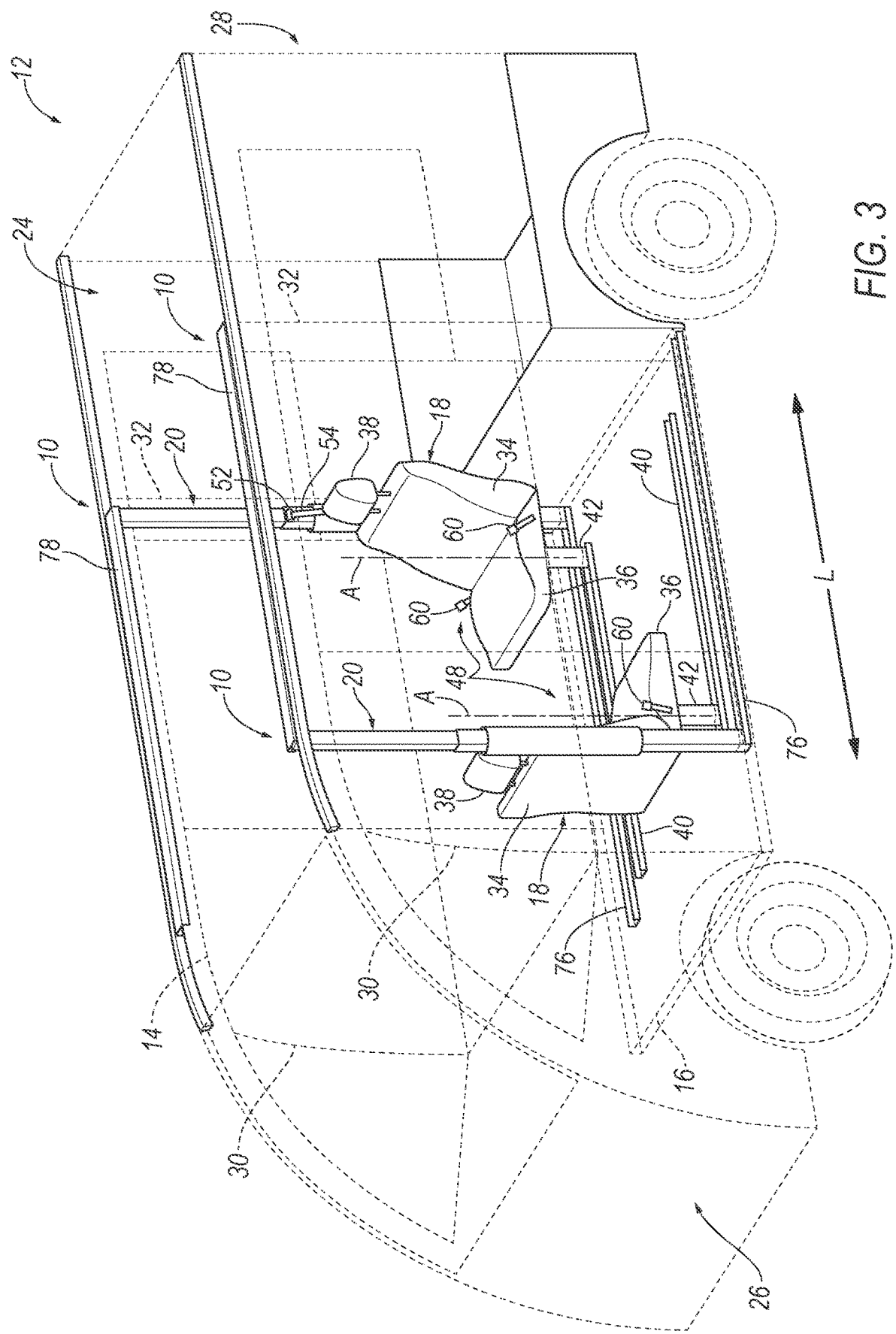
FIG. 3 is a perspective view of the vehicle having a pair of seats, one seat in a forward-facing position and one seat in a rearward-facing position.
Figure 4:
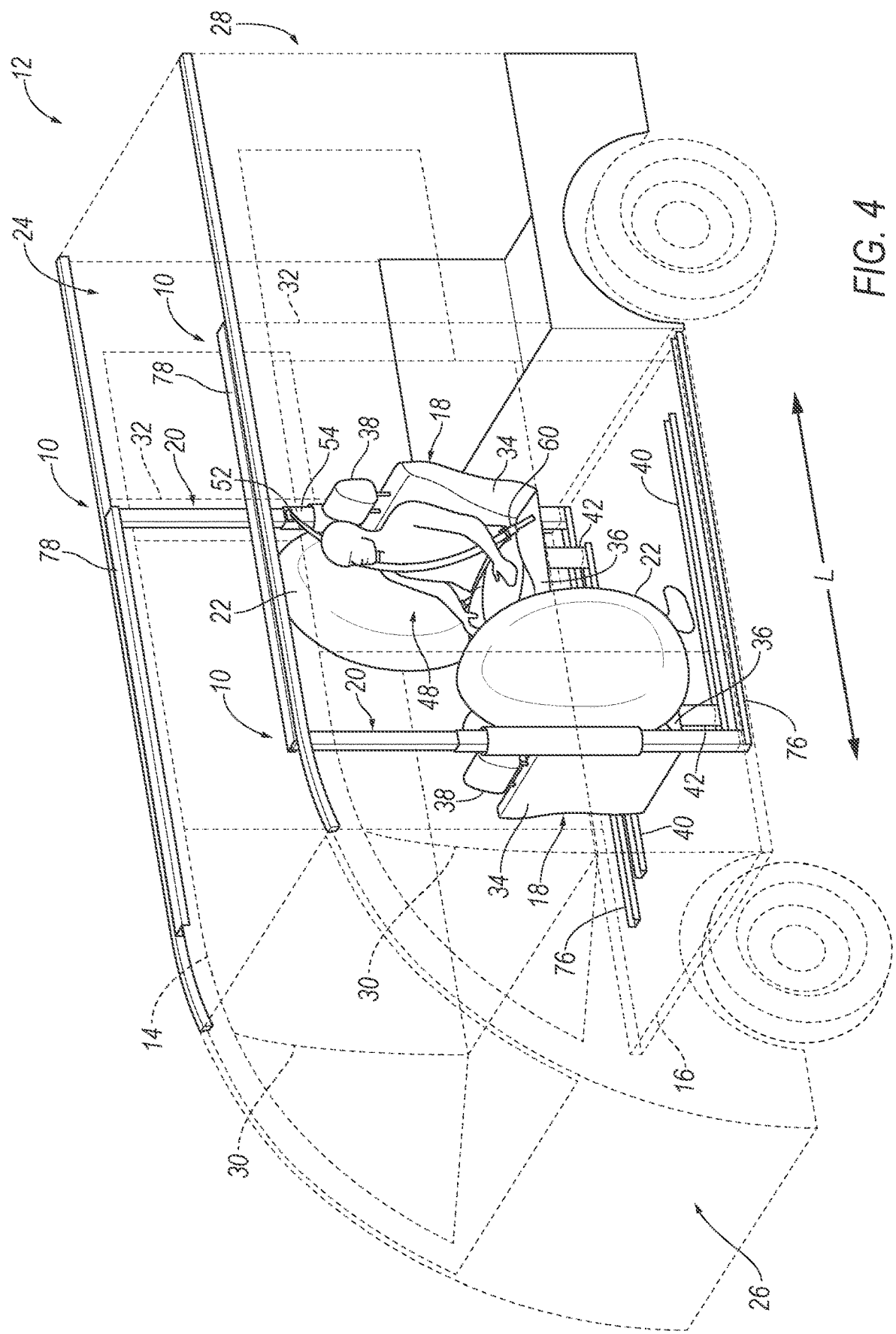
FIG. 4 is a perspective view of the seats adjacent slidable posts and airbags in an inflated position.

The vehicle 12 may include any suitable number of posts 20. Specifically, the assembly 10 may include a second post 20 spaced cross-vehicle from the post 20. In other words, the second post 20 may be on the opposite side of the vehicle 12 from the post 20 such that the second post 20 may be adjacent another seat 18 in the vehicle 12. In the example shown in FIGS. 1 and 2, the vehicle 12 may include four posts 20 adjacent four seats 18 in the vehicle 12. For example, as shown in FIGS. 3 and 4, the vehicle 12 may include two posts 20 adjacent two seats 18 in the vehicle 12. The vehicle 12 may include more or less posts 20 in the vehicle 12 than shown in the examples in the Figures. The second post 20 may be constructed the identically to the post 20, i.e., the second post 20 is slidable along the vehicle roof 14 and the vehicle floor 16 in the vehicle-longitudinal direction. The second post 20 includes all the same features as the post 20, e.g., a second airbag 22, supported by the second post 20, a second seatbelt assembly 50 supported by the second post 20, additional tracks 76, 78 included in the vehicle roof 14 and vehicle floor 16 for the second post 20 and seatbelt buckle 60 to be slidable along, etc.

The computer 92 includes a processor and a memory. The memory includes one or more forms of computer readable media, and stores instructions executable by the computer 92 for performing various operations, including as disclosed herein. For example, a computer 92 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 92 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 92.

The memory can be of any type, e.g., hard disk drives, solid state drives, servers, or any volatile or non-volatile media. The memory can store the collected data sent from the sensors. The memory can be a separate device from the computer 92, and the computer 92 can retrieve information stored by the memory via a network in the vehicle 12, e.g., over a CAN bus, a wireless network, etc. Alternatively or additionally, the memory can be part of the computer 92, e.g., as a memory of the computer 92. The computer 92 may include programming to operate one or more of vehicle 12 brakes, propulsion e.g., control of acceleration in the vehicle 12 by controlling one or more of an internal combustion engine, electric motor, hybrid engine, etc., steering, climate control, interior and/or exterior lights, etc., as well as to determine whether and when the computer 92, as opposed to a human operator, is to control such operations. Additionally, the computer 92 may be programmed to determine whether and when a human operator is to control such operations. The computer 92 may include or be communicatively coupled to, e.g., via a vehicle network such as a communications bus as described further below, more than one processor, e.g., included in components such as sensors, electronic control units (ECUs) or the like included in the vehicle 12 for monitoring and/or controlling various vehicle components, e.g., a powertrain controller, a brake controller, a steering controller, etc.

Figure 11:
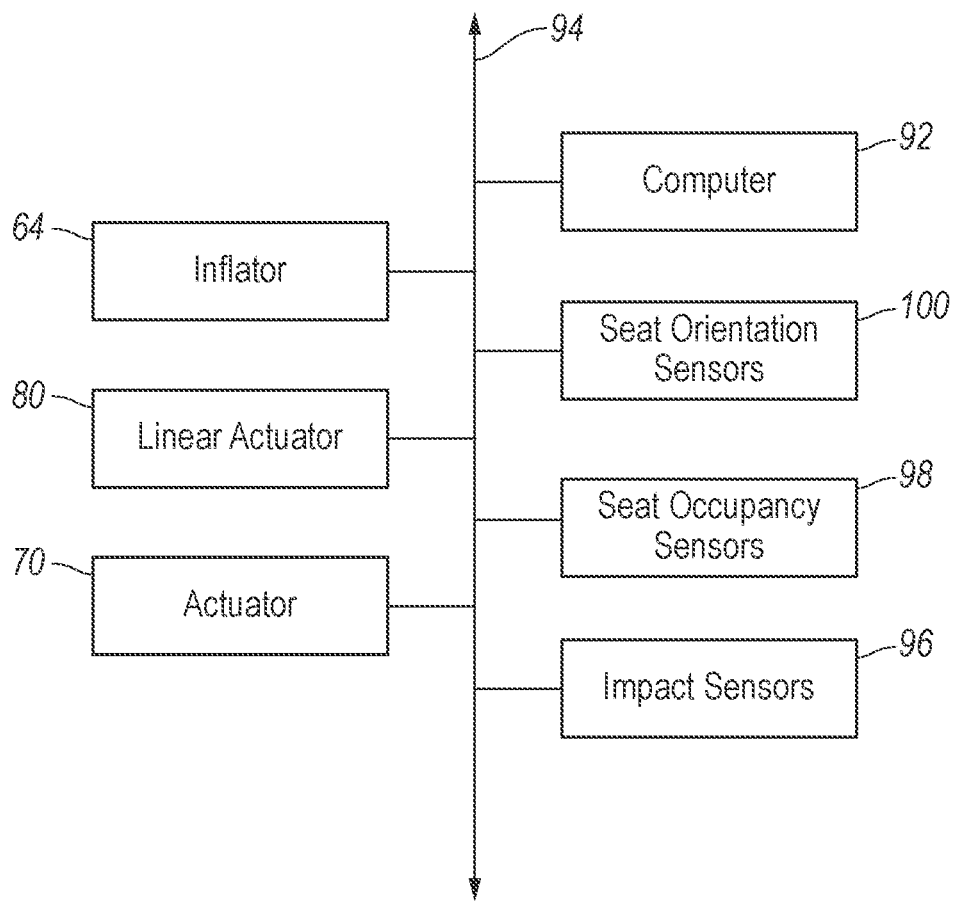
FIG. 11 is a block diagram of a vehicle communication network.

With reference to FIG. 11, the computer 92 is generally arranged for communications on a vehicle communication network 94 that can include a bus in the vehicle 12 such as a controller area network CAN or the like, and/or other wired and/or wireless mechanisms. Alternatively or additionally, in cases where the computer 92 actually comprises a plurality of devices, the vehicle communication network 94 may be used for communications between devices represented as the computer 92 in this disclosure. Further, as mentioned below, various controllers and/or sensors may provide data to the computer 92 via the vehicle communication network 94.

The vehicle 12 may include at least one impact sensor 96 for sensing impact of the vehicle 12, and the computer 92 in communication with the impact sensor 96 and the inflators 64. The computer 92 may activate the inflators 64, e.g., provide an impulse to a pyrotechnic charge of the inflators 64 when the impact sensor 96 senses an impact of the vehicle 12. Alternatively or additionally to sensing impact, the impact sensor 96 may be configured to sense impact prior to impact, i.e., pre impact sensing. The impact sensor 96 may be in communication with the computer 92. The impact sensor 96 is configured to detect an impact to the vehicle 12. The impact sensor 96 may be of any suitable type, for example, post 20 contact sensors such as accelerometers, pressure sensors, and contact switches; and pre impact sensors such as radar, LIDAR, and vision sensing systems. The vision sensing systems may include one or more cameras, CCD image sensors, CMOS image sensors, etc. The impact sensor 96 may be located at numerous points in or on the vehicle 12.

The vehicle 12 may include seat occupancy sensors 98 to identifying whether an occupant is seated in the any one of the seats 18. The seat occupancy sensors 98 may be activated when an occupant is identified to be seated in one or more of the seats 18. The seat occupancy sensors 98 may be in communication with the computer 92. The seat occupancy sensors 98 may send a signal to the computer 92 to indicate whether the seat 18 is occupied. The seat occupancy sensor 98 may be any suitable type of occupancy sensor, e.g., weight sensor, cameras, etc. The vehicle 12 may include any suitable number of seat occupancy sensors 98. For example, the vehicle 12 may include a number of seat occupancy sensors 98 equal to the number of seats 18 in the vehicle 12.

The vehicle 12 may include one or more seat orientation sensors 100 to determine the orientation of the seat 18 and/or seats 18, i.e., the seat orientation sensors 100 may indicate whether the seats 18 are in the forward-facing position or the rearward-facing position and the longitudinal position of the seat 18 in the vehicle 12 along the seat track 40. The seat orientation sensors 100 may be in communication with the computer 92. The seat orientation sensors 100 may send a signal to the computer 92 to indicate whether the seat 18 is in the forward-facing position or the rearward-facing position and indicating the longitudinal position of the seat 18. The vehicle 12 may include any suitable number of seat orientation sensors 100 to determine the orientation of multiple seats 18 in the vehicle 12. For example, the vehicle 12 may include a number of seat orientation sensors 100 equal to the number of seats 18 that are rotatable in the vehicle 12.

Figure 12:
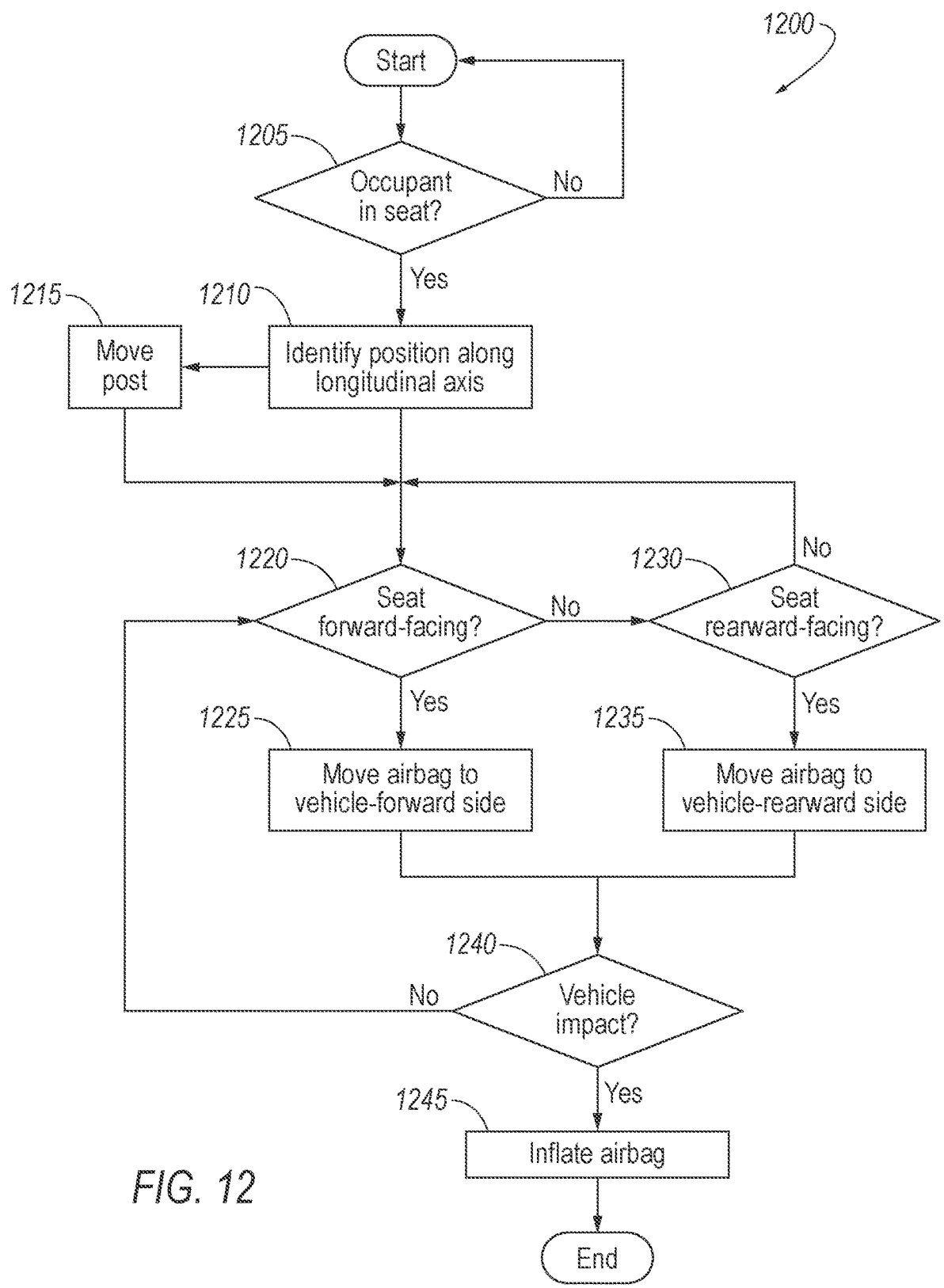
FIG. 12 is a flowchart of a method executable by a computer of the vehicle.

With reference to FIG. 12, the computer 92 stores instructions to control components of the vehicle 12 according to the method 1200. Specifically, the method 1200 includes moving the airbag 22 relative to the post 20 based on the position of the seat 18. Any use of "in response to," "based on," and "upon determining" herein, including with reference to method 1200, indicates a causal relationship, not merely a temporal relationship.

With reference to decision block 1205, the method 1200 includes identifying whether an occupant is seated in the seat 18. The seat occupancy sensor 98 may indicate to the computer 92 that one or more occupants is seated in one or more seats 18 of the vehicle 12. If no occupant is identified, the method 1200 returns to the start. If an occupant is identified, the method 1200 moves to block 1210.

With reference to block 1210, the method 1200 includes identifying a position of the seat 18 along the vehicle-longitudinal axis L. The seat orientation sensors 100 may send a signal to the computer 92 indicating the position of the seat 18 along the vehicle-longitudinal axis L.

With reference to block 1215, based on the position of the seat 18 along the vehicle-longitudinal axis L, the method 1200 includes sliding the post 20 to a position along the vehicle-longitudinal axis L corresponding to the position of the seat 18. The computer 92 may activate the linear actuator 80 to move the post 20 from the undeployed position to the deployed position adjacent the seat 18.

With reference to decision block 1220, the method 1200 includes identifying whether the seat 18 is in the forward-facing position. The seat orientation sensor 100 may send a signal to the computer 92 identifying whether the seat 18 is in the forward-facing position. If the seat 18 is in the forward-facing position, the method 1200 moves to block 1225. If the seat 18 is not in the forward-facing position, the method 1200 moves to decision block 1230.

With reference to block 1225, the method 1200 includes moving the airbag 22 to a vehicle-forward side 44 of the post 20 based on identification that the seat 18 is in the forward-facing position. In the example shown in the Figures, the airbag 22 motor rotates the airbag pinion 74 to move the airbag 22 to the vehicle-forward side 44 of the post 20.

With reference to decision block 1230, based on identifying the seat 18 is not in the forward-facing position, the method 1200 includes identifying the seat 18 is in the rearward-facing position. If the seat 18 is identified as being in the rearward-facing position, the method 1200 moves to block 1235. If the seat 18 is not in the rearward-facing position, the method 1200 returns to decision block 1220.

With reference to block 1235, the method 1200 includes moving the airbag 22 to a vehicle-rearward side 46 of the post 20 based on identification that the seat 18 is in the rearward-facing position. In the example shown in the Figures, the airbag 22 motor rotates the airbag pinion 74 to move the airbag 22 to the vehicle-rearward side 46 of the post 20.

With reference to decision block 1240, the method 1200 includes identifying whether certain vehicle impact has occurred. The impact sensors 96 may sense the vehicle impact. The impact sensors 96 may send a signal to the computer 92 indicating the vehicle impact has occurred. If no vehicle impact is identified, the method 1200 returns to decision block 1220. If a vehicle impact is identified, the method 1200 moves to block 1245.

With reference to block 1245, based on the identification of the vehicle impact, the method 1200 includes inflating the airbag 22 to the inflated position. The computer 92 may send a signal to the inflator 64 to inflate the airbag 22 to the inflated position. The airbag 22 may control the kinematics of the occupant in the event of certain vehicle impact.

The numerical adverbs "first" and "second" are used herein merely as identifiers and do not signify order or importance.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a vehicle roof and a vehicle floor spaced from the vehicle roof;
a seat supported by the vehicle floor, the seat being rotatable about an axis of rotation from a forward-facing position to a rearward-facing position and the seat being movable along a vehicle-longitudinal axis;
a post elongated from the vehicle floor to the vehicle roof, the post being slidable along the vehicle roof and the vehicle floor along the vehicle-longitudinal axis adjacent the seat; and
an airbag supported by the post.

2. The assembly of claim 1, wherein the airbag is movable about the post.

3. The assembly of claim 1, wherein the post includes a vehicle-forward side and a vehicle-rearward side, the airbag being movable about the post from the vehicle-forward side to the vehicle-rearward side.

4. The assembly of claim 3, wherein the airbag is on the vehicle-forward side of the post when the seat is in the forward-facing position and the airbag is on the vehicle-rearward side of the post when the seat is in the rearward-facing position.

5. The assembly of claim 3, wherein the airbag is inflatable in a vehicle-forward direction when the airbag is on the vehicle-forward side of the post and the airbag is inflatable in a vehicle-rearward direction when the airbag is on the vehicle-rearward side of the post.

6. The assembly of claim 1, wherein the seat is slidable along the vehicle-longitudinal axis, the post being slidable to a position along the vehicle-longitudinal axis corresponding to a position of the seat along the vehicle-longitudinal axis.

7. The assembly of claim 1, wherein the airbag is inflatable between the seat and the post.

8. The assembly of claim 1, wherein the seat defines an occupant seating area vehicle-inboard of the post, the airbag being inflatable between the post and the occupant seating area.

9. The assembly of claim 1, further comprising a seatbelt assembly supported by the post, the seatbelt assembly including a clip and a seatbelt webbing.

10. The assembly of claim 9, further comprising a pair of seatbelt buckles supported by the seat, the seatbelt buckles being spaced from each other in a cross-seat direction and the seatbelt buckles being engageable with the clip.

11. The assembly of claim 10, wherein the clip is engageable with one of the seatbelt buckles when the seat is in the forward-facing position and the clip is engageable with the other of the seatbelt buckles when the seat is in the rearward-facing position.

12. The assembly of claim 10, wherein the airbag is inflatable to an inflated position in response to certain vehicle impact when the clip is engaged with one of the seatbelt buckles.

13. The assembly of claim 1, wherein the vehicle roof includes a first track and the vehicle floor includes a second track, the post being slidable along the first track and the second track.

14. The assembly of claim 13, wherein the post is lockable relative to the first track and the second track, the first track including at least one slot and the post including at least one peg receivable by the slot.

15. The assembly of claim 1, further comprising a motor operatively coupled to the airbag.

16. The assembly of claim 1, further comprising:
a second seat supported by the vehicle floor, the second seat being rotatable about an axis of rotation from a forward-facing position to a rearward-facing position and the seat being movable along the vehicle-longitudinal axis;
a second post elongated from the vehicle floor to the vehicle roof, the second post being slidable along the vehicle roof and the vehicle floor along the vehicle-longitudinal axis adjacent the second seat; and
a second airbag supported by the second post.

17. The assembly of claim 1, further comprising a computer including a processor and a memory storing instructions executable by the processor to:

identify a position of the seat along the vehicle-longitudinal axis; and slide the post to a position along the vehicle-longitudinal axis corresponding to the position of the seat.

18. The assembly of claim 17, wherein the instructions further include instructions to:

identify the seat is in the forward-facing position; and move the airbag to a vehicle-forward side of the post based on identification that the seat is in the forward-facing position.

19. The assembly of claim 17, wherein the instructions further include instructions to:

identify the seat is in the rearward-facing position; and move the airbag to a vehicle-rearward side of the post based on identification that the seat is in the rearward-facing position.

20. The assembly of claim 1, wherein the post is lockable relative to the vehicle floor and the vehicle roof.

\* \* \* \* \*